(12) United States Patent
Ponce et al.

(10) Patent No.: US 9,672,178 B1
(45) Date of Patent: Jun. 6, 2017

(54) BIT-MAPPED DMA TRANSFER WITH DEPENDENCY TABLE CONFIGURED TO MONITOR STATUS SO THAT A PROCESSOR IS NOT RENDERED AS A BOTTLENECK IN A SYSTEM

(71) Applicant: BiTMICRO Networks, Inc., Fremont, CA (US)

(72) Inventors: Cyrill C. Ponce, Malabon (PH); Marizonne O. Fuentes, Tanauan (PH); Gianico G. Noble, San Pedro (PH)

(73) Assignee: BiTMICRO Networks, Inc., Fremont, CA (US)

( * ) Notice: Subject to any disclaimer, the term of this patent is extended or adjusted under 35 U.S.C. 154(b) by 103 days.

(21) Appl. No.: 14/687,700

(22) Filed: Apr. 15, 2015

Related U.S. Application Data

(63) Continuation-in-part of application No. 14/217,467, filed on Mar. 17, 2014, now Pat. No. 9,400,617.
(Continued)

(51) Int. Cl.
*G06F 3/00* (2006.01)
*G06F 13/00* (2006.01)
(Continued)

(52) U.S. Cl.
CPC ............ *G06F 13/37* (2013.01); *G06F 13/287* (2013.01)

(58) Field of Classification Search
CPC ............................... G06F 13/37; G06F 13/287
(Continued)

(56) References Cited

U.S. PATENT DOCUMENTS 4,752,871 A 6/1988 Sparks
5,111,058 A 5/1992 Martin
(Continued)

FOREIGN PATENT DOCUMENTS

JP 2005142859 A 6/2005
JP 2005-309847 11/2005
(Continued)

OTHER PUBLICATIONS

USPTO Notice of Allowability & attachment(s) mailed Jan. 7, 2013 for U.S. Appl. No. 12/876,247.
(Continued)

*Primary Examiner* — Tammara Peyton

(57) ABSTRACT

In an embodiment of the invention, a method comprises: A method, comprising: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table. In another embodiment of the invention, an apparatus comprises: a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the subindex is in the dependency table.

20 Claims, 4 Drawing Sheets

Related U.S. Application Data

(60) Provisional application No. 61/979,878, filed on Apr. 15, 2014, provisional application No. 61/802,367, filed on Mar. 15, 2013.

(51) Int. Cl.
  *G06F 13/37* (2006.01)
  *G06F 13/28* (2006.01)

(58) Field of Classification Search
  USPC .................................................. 710/22, 308
  See application file for complete search history.

(56) References Cited

U.S. PATENT DOCUMENTS

| | | |
|---|---|---|
| RE34,100 E | 10/1992 | Hartness |
| 5,222,046 A | 6/1993 | Kreifels et al. |
| 5,297,148 A | 3/1994 | Harari et al. |
| 5,341,339 A | 8/1994 | Wells |
| 5,371,709 A | 12/1994 | Fisher et al. |
| 5,379,401 A | 1/1995 | Robinson et al. |
| 5,388,083 A | 2/1995 | Assar et al. |
| 5,396,468 A | 3/1995 | Harari et al. |
| 5,406,529 A | 4/1995 | Asano |
| 5,432,748 A | 7/1995 | Hsu et al. |
| 5,448,577 A | 9/1995 | Wells et al. |
| 5,459,850 A | 10/1995 | Clay et al. |
| 5,479,638 A | 12/1995 | Assar et al. |
| 5,485,595 A | 1/1996 | Assar et al. |
| 5,488,711 A | 1/1996 | Hewitt et al. |
| 5,500,826 A | 3/1996 | Hsu et al. |
| 5,509,134 A | 4/1996 | Fandrich et al. |
| 5,513,138 A | 4/1996 | Manabe et al. |
| 5,524,231 A | 6/1996 | Brown |
| 5,530,828 A | 6/1996 | Kaki et al. |
| 5,535,328 A | 7/1996 | Harari et al. |
| 5,535,356 A | 7/1996 | Kim et al. |
| 5,542,042 A | 7/1996 | Manson |
| 5,542,082 A | 7/1996 | Solhjell |
| 5,548,741 A | 8/1996 | Watanabe |
| 5,559,956 A | 9/1996 | Sukegawa |
| 5,568,423 A | 10/1996 | Jou et al. |
| 5,568,439 A | 10/1996 | Harari |
| 5,572,466 A | 11/1996 | Sukegawa |
| 5,594,883 A | 1/1997 | Pricer |
| 5,602,987 A | 2/1997 | Harari et al. |
| 5,603,001 A | 2/1997 | Sukegawa et al. |
| 5,606,529 A | 2/1997 | Honma et al. |
| 5,606,532 A | 2/1997 | Lambrache et al. |
| 5,619,470 A | 4/1997 | Fukumoto |
| 5,627,783 A | 5/1997 | Miyauchi |
| 5,640,349 A | 6/1997 | Kakinuma et al. |
| 5,644,784 A | 7/1997 | Peek |
| 5,682,509 A | 10/1997 | Kabenjian |
| 5,737,742 A | 4/1998 | Achiwa et al. |
| 5,787,466 A | 7/1998 | Berliner |
| 5,796,182 A | 8/1998 | Martin |
| 5,799,200 A | 8/1998 | Brant et al. |
| 5,802,554 A | 9/1998 | Caceres et al. |
| 5,819,307 A | 10/1998 | Iwamoto et al. |
| 5,822,251 A | 10/1998 | Bruce et al. |
| 5,875,351 A | 2/1999 | Riley |
| 5,881,264 A | 3/1999 | Kurosawa |
| 5,913,215 A | 6/1999 | Rubinstein et al. |
| 5,918,033 A | 6/1999 | Heeb et al. |
| 5,943,421 A | 8/1999 | Grabon |
| 5,956,743 A | 9/1999 | Bruce et al. |
| 6,000,006 A | 12/1999 | Bruce et al. |
| 6,014,709 A | 1/2000 | Gulick et al. |
| 6,076,137 A | 6/2000 | Asnaashari |
| 6,098,119 A | 8/2000 | Surugucchi et al. |
| 6,128,303 A | 10/2000 | Bergantino |
| 6,215,875 B1 | 4/2001 | Nohda |
| 6,230,269 B1 | 5/2001 | Spies et al. |
| 6,298,071 B1 | 10/2001 | Taylor et al. |
| 6,363,441 B1 | 3/2002 | Beniz et al. |
| 6,363,444 B1 | 3/2002 | Platko et al. |
| 6,397,267 B1 | 5/2002 | Chong, Jr. |
| 6,404,772 B1 | 6/2002 | Beach et al. |
| 6,496,939 B2 | 12/2002 | Portman et al. |
| 6,526,506 B1 | 2/2003 | Lewis |
| 6,529,416 B2 | 3/2003 | Bruce et al. |
| 6,557,095 B1 | 4/2003 | Henstrom |
| 6,678,754 B1 | 1/2004 | Soulier |
| 6,744,635 B2 | 6/2004 | Portman et al. |
| 6,757,845 B2 | 6/2004 | Bruce |
| 6,857,076 B1 | 2/2005 | Klein |
| 6,901,499 B2 | 5/2005 | Aasheim et al. |
| 6,922,391 B1 | 7/2005 | King et al. |
| 6,961,805 B2 | 11/2005 | Lakhani et al. |
| 6,970,446 B2 | 11/2005 | Krischer et al. |
| 6,970,890 B1 | 11/2005 | Bruce et al. |
| 6,980,795 B1 | 12/2005 | Hermann et al. |
| 7,103,684 B2 | 9/2006 | Chen et al. |
| 7,174,438 B2 | 2/2007 | Homma et al. |
| 7,194,766 B2 | 3/2007 | Noehring et al. |
| 7,263,006 B2 | 8/2007 | Aritome |
| 7,283,629 B2 | 10/2007 | Kaler et al. |
| 7,305,548 B2 | 12/2007 | Pierce et al. |
| 7,330,954 B2 | 2/2008 | Nangle |
| 7,372,962 B2 | 5/2008 | Fujimoto et al. |
| 7,386,662 B1 | 6/2008 | Kekre et al. |
| 7,415,549 B2 | 8/2008 | Vemula et al. |
| 7,424,553 B1 | 9/2008 | Borrelli et al. |
| 7,430,650 B1 | 9/2008 | Ross |
| 7,490,177 B2 | 2/2009 | Kao |
| 7,500,063 B2 | 3/2009 | Zohar et al. |
| 7,506,098 B2 | 3/2009 | Arcedera et al. |
| 7,613,876 B2 | 11/2009 | Bruce et al. |
| 7,620,748 B1 | 11/2009 | Bruce et al. |
| 7,624,239 B2 | 11/2009 | Bennett et al. |
| 7,636,801 B1 | 12/2009 | Kekre et al. |
| 7,660,941 B2 | 2/2010 | Lee et al. |
| 7,676,640 B2 | 3/2010 | Chow |
| 7,681,188 B1 | 3/2010 | Tirumalai et al. |
| 7,716,389 B1 | 5/2010 | Bruce et al. |
| 7,729,370 B1 | 6/2010 | Orcine et al. |
| 7,743,202 B2 | 6/2010 | Tsai et al. |
| 7,765,359 B2 | 7/2010 | Kang et al. |
| 7,877,639 B2 | 1/2011 | Hoang |
| 7,913,073 B2 | 3/2011 | Choi |
| 7,921,237 B1 | 4/2011 | Holland et al. |
| 7,934,052 B2 | 4/2011 | Prins et al. |
| 8,010,740 B2 | 8/2011 | Arcedera et al. |
| 8,032,700 B2 | 10/2011 | Bruce et al. |
| 8,156,320 B2 | 4/2012 | Borras |
| 8,161,223 B1 | 4/2012 | Chamseddine et al. |
| 8,165,301 B1 | 4/2012 | Bruce et al. |
| 8,200,879 B1 | 6/2012 | Falik et al. |
| 8,341,311 B1 | 12/2012 | Szewerenko et al. |
| 8,375,257 B2 | 2/2013 | Hong et al. |
| 8,447,908 B2 | 5/2013 | Bruce et al. |
| 8,510,631 B2 | 8/2013 | Wu et al. |
| 8,560,804 B2 | 10/2013 | Bruce et al. |
| 8,707,134 B2 | 4/2014 | Takahashi et al. |
| 8,713,417 B2 | 4/2014 | Jo |
| 8,788,725 B2 | 7/2014 | Bruce et al. |
| 8,959,307 B1 | 2/2015 | Bruce et al. |
| 9,043,669 B1 | 5/2015 | Bruce et al. |
| 9,099,187 B2 | 8/2015 | Bruce et al. |
| 9,135,190 B1 | 9/2015 | Bruce et al. |
| 9,147,500 B2 | 9/2015 | Kim et al. |
| 2001/0010066 A1 | 7/2001 | Chin et al. |
| 2002/0044486 A1 | 4/2002 | Chan et al. |
| 2002/0073324 A1 | 6/2002 | Hsu et al. |
| 2002/0083262 A1 | 6/2002 | Fukuzumi |
| 2002/0083264 A1 | 6/2002 | Coulson |
| 2002/0141244 A1 | 10/2002 | Bruce et al. |
| 2003/0023817 A1 | 1/2003 | Rowlands et al. |
| 2003/0065836 A1 | 4/2003 | Pecone |
| 2003/0120864 A1 | 6/2003 | Lee et al. |
| 2003/0131201 A1 | 7/2003 | Khare et al. |
| 2003/0163624 A1 | 8/2003 | Matsui et al. |
| 2003/0163647 A1 | 8/2003 | Cameron et al. |

(56) References Cited

U.S. PATENT DOCUMENTS

| | | |
|---|---|---|
| 2003/0163649 A1 | 8/2003 | Kapur et al. |
| 2003/0182576 A1 | 9/2003 | Morlang et al. |
| 2003/0204675 A1 | 10/2003 | Dover et al. |
| 2003/0223585 A1 | 12/2003 | Tardo et al. |
| 2004/0073721 A1 | 4/2004 | Goff et al. |
| 2004/0128553 A1 | 7/2004 | Buer et al. |
| 2005/0050245 A1 | 3/2005 | Miller et al. |
| 2005/0120146 A1 | 6/2005 | Chen et al. |
| 2005/0210149 A1 | 9/2005 | Kimball |
| 2005/0243610 A1 | 11/2005 | Guha et al. |
| 2005/0289361 A1 | 12/2005 | Sutardja |
| 2006/0004957 A1 | 1/2006 | Hand, III et al. |
| 2006/0031450 A1 | 2/2006 | Unrau et al. |
| 2006/0095709 A1 | 5/2006 | Achiwa |
| 2006/0112251 A1 | 5/2006 | Karr et al. |
| 2006/0184723 A1 | 8/2006 | Sinclair et al. |
| 2007/0019573 A1 | 1/2007 | Nishimura |
| 2007/0028040 A1 | 2/2007 | Sinclair |
| 2007/0058478 A1 | 3/2007 | Murayama |
| 2007/0073922 A1 | 3/2007 | Go et al. |
| 2007/0083680 A1 | 4/2007 | King et al. |
| 2007/0088864 A1 | 4/2007 | Foster |
| 2007/0094450 A1 | 4/2007 | VanderWiel |
| 2007/0096785 A1 | 5/2007 | Maeda |
| 2007/0121499 A1 | 5/2007 | Pal et al. |
| 2007/0130439 A1 | 6/2007 | Andersson et al. |
| 2007/0159885 A1 | 7/2007 | Gorobets |
| 2007/0168754 A1 | 7/2007 | Zohar et al. |
| 2007/0174493 A1 | 7/2007 | Irish et al. |
| 2007/0174506 A1 | 7/2007 | Tsuruta |
| 2007/0195957 A1 | 8/2007 | Arulambalam et al. |
| 2007/0288686 A1 | 12/2007 | Arcedera et al. |
| 2007/0288692 A1 | 12/2007 | Bruce et al. |
| 2008/0052456 A1 | 2/2008 | Ash et al. |
| 2008/0072031 A1 | 3/2008 | Choi |
| 2008/0147963 A1 | 6/2008 | Tsai et al. |
| 2008/0189466 A1 | 8/2008 | Hemmi |
| 2008/0218230 A1 | 9/2008 | Shim |
| 2008/0228959 A1 | 9/2008 | Wang |
| 2009/0055573 A1 | 2/2009 | Ito |
| 2009/0077306 A1 | 3/2009 | Arcedera et al. |
| 2009/0083022 A1 | 3/2009 | Bin Mohd Nordin et al. |
| 2009/0094411 A1 | 4/2009 | Que |
| 2009/0158085 A1 | 6/2009 | Kern et al. |
| 2009/0172250 A1 | 7/2009 | Allen et al. |
| 2009/0172466 A1 | 7/2009 | Royer et al. |
| 2009/0240873 A1 | 9/2009 | Yu et al. |
| 2010/0058045 A1 | 3/2010 | Borras et al. |
| 2010/0095053 A1 | 4/2010 | Bruce et al. |
| 2010/0125695 A1 | 5/2010 | Wu et al. |
| 2010/0250806 A1 | 9/2010 | Devilla et al. |
| 2011/0022778 A1 | 1/2011 | Schibilla et al. |
| 2011/0022801 A1 | 1/2011 | Flynn |
| 2011/0087833 A1 | 4/2011 | Jones |
| 2011/0093648 A1 | 4/2011 | Belluomini et al. |
| 2011/0113186 A1 | 5/2011 | Bruce et al. |
| 2011/0145479 A1 | 6/2011 | Talagala et al. |
| 2011/0161568 A1 | 6/2011 | Bruce et al. |
| 2011/0167204 A1 | 7/2011 | Estakhri et al. |
| 2011/0197011 A1 | 8/2011 | Suzuki et al. |
| 2011/0202709 A1 | 8/2011 | Rychlik |
| 2011/0258405 A1 | 10/2011 | Asaki et al. |
| 2011/0264884 A1 | 10/2011 | Kim |
| 2011/0264949 A1 | 10/2011 | Ikeuchi et al. |
| 2011/0270979 A1 | 11/2011 | Schlansker et al. |
| 2012/0005405 A1 | 1/2012 | Wu et al. |
| 2012/0005410 A1 | 1/2012 | Ikeuchi |
| 2012/0017037 A1 | 1/2012 | Riddle et al. |
| 2012/0102263 A1 | 4/2012 | Aswadhati |
| 2012/0102268 A1 | 4/2012 | Smith et al. |
| 2012/0137050 A1 | 5/2012 | Wang et al. |
| 2012/0271967 A1 | 10/2012 | Hirschman |
| 2012/0311197 A1 | 12/2012 | Larson et al. |
| 2013/0094312 A1 | 4/2013 | Jang et al. |
| 2013/0099838 A1 | 4/2013 | Kim et al. |
| 2013/0111135 A1 | 5/2013 | Bell, Jr. et al. |
| 2013/0208546 A1 | 8/2013 | Kim et al. |
| 2013/0212337 A1 | 8/2013 | Maruyama |
| 2013/0212349 A1 | 8/2013 | Maruyama |
| 2013/0246694 A1 | 9/2013 | Bruce et al. |
| 2013/0262750 A1 | 10/2013 | Yamasaki et al. |
| 2013/0282933 A1 | 10/2013 | Jokinen et al. |
| 2013/0304775 A1 | 11/2013 | Davis et al. |
| 2013/0339578 A1 | 12/2013 | Ohya et al. |
| 2013/0339582 A1 | 12/2013 | Olbrich et al. |
| 2013/0346672 A1 | 12/2013 | Sengupta et al. |
| 2014/0095803 A1 | 4/2014 | Kim et al. |
| 2014/0104949 A1 | 4/2014 | Bruce et al. |
| 2014/0108869 A1 | 4/2014 | Brewerton et al. |
| 2014/0189203 A1 | 7/2014 | Suzuki et al. |
| 2014/0258788 A1 | 9/2014 | Maruyama |
| 2014/0285211 A1 | 9/2014 | Raffinan |
| 2014/0331034 A1 | 11/2014 | Ponce et al. |
| 2015/0006766 A1 | 1/2015 | Ponce et al. |
| 2015/0012690 A1 | 1/2015 | Bruce et al. |
| 2015/0032937 A1 | 1/2015 | Salessi |
| 2015/0032938 A1 | 1/2015 | Salessi |
| 2015/0067243 A1 | 3/2015 | Salessi et al. |
| 2015/0149697 A1 | 5/2015 | Salessi et al. |
| 2015/0149706 A1 | 5/2015 | Salessi et al. |
| 2015/0153962 A1 | 6/2015 | Salessi et al. |
| 2015/0169021 A1 | 6/2015 | Salessi et al. |
| 2015/0261456 A1 | 9/2015 | Alcantara et al. |
| 2015/0261475 A1 | 9/2015 | Alcantara et al. |
| 2015/0261797 A1 | 9/2015 | Alcantara et al. |
| 2015/0370670 A1 | 12/2015 | Lu |
| 2015/0371684 A1 | 12/2015 | Mataya |
| 2015/0378932 A1 | 12/2015 | Souri et al. |
| 2016/0026402 A1 | 1/2016 | Alcantara et al. |
| 2016/0027521 A1 | 1/2016 | Lu |
| 2016/0041596 A1 | 2/2016 | Alcantara et al. |

FOREIGN PATENT DOCUMENTS

| | | |
|---|---|---|
| TW | 489308 | 6/2002 |
| TW | 200428219 A | 12/2004 |
| TW | 436689 | 12/2005 |
| TW | I420316 | 12/2013 |
| WO | WO 94/06210 | 3/1994 |
| WO | WO 98/38568 | 9/1998 |

OTHER PUBLICATIONS

Office Action mailed Sep. 14, 2012 for U.S. Appl. No. 12/876,247.
Office Action mailed Feb. 1, 2012 for U.S. Appl. No. 12/876,247.
Notice of Allowance/Allowability mailed Mar. 31, 2015 for U.S. Appl. No. 13/475,878.
Office Action mailed May 22, 2015 for U.S. Appl. No. 13/253,912.
Office Action for U.S. Appl. No. 12/876,113 mailed on Mar. 13, 2014.
Advisory Action for U.S. Appl. No. 12/876,113 mailed on Sep. 6, 2013.
Office Action for U.S. Appl. No. 12/876,113 mailed on May 14, 2013.
Office Action for U.S. Appl. No. 12/876,113 mailed on Dec. 21, 2012.
Security Comes to SNMP: The New SNMPv3 Proposed Internet Standard, The Internet Protocol Journal, vol. 1, No. 3, Dec. 1998.
Notice of Allowability for U.S. Appl. No. 12/882,059 mailed on May 30, 2013.
Notice of Allowability for U.S. Appl. No. 12/882,059 mailed on Feb. 14, 2013.
Office Action for U.S. Appl. No. 12/882,059 mailed on May 11, 2012.
Notice of Allowability for U.S. Appl. No. 14/038,684 mailed on Aug. 1, 2014.
Office Action for U.S. Appl. No. 14/038,684 mailed on Mar. 17, 2014.
Office Action mailed Sep. 11, 2015 for U.S. Appl. No. 14/217,436.
Office Action mailed Sep. 24, 2015 for U.S. Appl. No. 14/217,334.

(56) References Cited

OTHER PUBLICATIONS

Office Action dated Sep. 18, 2015 for Taiwanese Patent Application No. 102144165.
Office Action mailed Sep. 29, 2015 for U.S. Appl. No. 14/217,316.
Office Action mailed Sep. 28, 2015 for U.S. Appl. No. 14/689,045.
Office Action for U.S. Appl. No. 13/475,878 mailed on Jun. 23, 2014.
Office Action for U.S. Appl. No. 12/876,113 mailed on Oct. 16, 2014.
Notice of Allowance for U.S. Appl. No. 12/270,626 mailed on Oct. 3, 2014.
Office Action for U.S. Appl. No. 12/270,626 mailed on May 23, 2014.
Office Action for U.S. Appl. No. 12/270,626 mailed on Dec. 18, 2013.
Office Action for U.S. Appl. No. 12/270,626 mailed on Aug. 23, 2012.
Office Action mailed Dec. 5, 2014 for U.S. Appl. No. 14/038,684.
Office Action mailed Oct. 8, 2015 for U.S. Appl. No. 14/217,291.
Final Office Action mailed Nov. 19, 2015 for U.S. Appl. No. 14/217,249.
Final Office Action mailed Nov. 18, 2015 for U.S. Appl. No. 14/217,467.
Office Action mailed Nov. 25, 2015 for U.S. Appl. No. 14/217,041.
Office Action mailed Oct. 5, 2015 for Taiwanese Application No. 103105076.
Office Action mailed Nov. 19, 2015 for U.S. Appl. No. 14/217,249.
Office Action mailed Nov. 18, 2015 for U.S. Appl. No. 14/217,467.
Office Action mailed Dec. 4, 2015 for U.S. Appl. No. 14/616,700.
Office Action mailed Jun. 4, 2015 for U.S. Appl. No. 14/215,414.
Office Action mailed Dec. 15, 2015 for U.S. Appl. No. 13/253,912.
Office Action mailed Dec. 17, 2015 for U.S. Appl. No. 14/214,216.
Office Action mailed Dec. 17, 2015 for U.S. Appl. No. 14/215,414.
Office Action mailed Dec. 17, 2015 for U.S. Appl. No. 14/803,107.
Office Action mailed Jan. 15, 2016 for U.S. Appl. No. 14/866,946.
Office Action mailed Jan. 11, 2016 for U.S. Appl. No. 14/217,399.
Office Action mailed Jan. 15, 2016 for U.S. Appl. No. 14/216,937.
Notice of Allowance and Examiner-Initiated Interview Summary, mailed Jan. 29, 2016 for U.S. Appl. No. 14/297,628.
National Science Fountation,Award Abstract #1548968, SBIR Phase I: SSD In-Situ Processing, http://www.nsf.gov/awardsearch/showAward?AWD_ID=1548968 printed on Feb. 13, 2016.
Design-Reuse, NxGn Data Emerges from Stealth Mode to provide a paradigm shift in enterprise storage solution. http://www.design-reuse.com/news/35111/nxgn-data-intelligent-solutions.html, printed on Feb. 13, 2016.
Office Action for U.S. Appl. No. 14/217,365 dated Feb. 18, 2016.
Office Action for U.S. Appl. No. 14/217,365 dated Mar. 2, 2016.
Office Action for U.S. Appl. No. 14/690,305 dated Feb. 25, 2016.
Office Action for U.S. Appl. No. 14/217,436 dated Feb. 25, 2016.
Office Action for U.S. Appl. No. 14/217,316 dated Feb. 26, 2016.
Office Action for U.S. Appl. No. 14/215,414 dated Mar. 1, 2016.
Office Action for U.S. Appl. No. 14/616,700 dated Mar. 8, 2016.
Notice of allowance/allowability for U.S. Appl. No. 14/217,041 dated Apr. 11, 2016.
Notice of allowance/allowability for U.S. Appl. No. 14/803,107 dated Mar. 28, 2016.
Office Action for U.S. Appl. No. 14/217,334 dated Apr. 4, 2016.
Office Action for U.S. Appl. No. 14/217,249 dated Apr. 21, 2016.
Notice of allowance/allowability for U.S. Appl. No. 14/217,467 dated Apr. 20, 2016.
Notice of allowance/allowability for U.S. Appl. No. 13/253,912 dated Mar. 21, 2016.
Notice of Allowance/Allowability for U.S. Appl. No. 13/890,229 mailed on Feb. 20, 2014.
Office Action for U.S. Appl. No. 13/890,229 mailed on Oct. 8, 2013.
Office Action for U.S. Appl. No. 12/876,113 mailed on Dec. 5, 2014.
Notice of Allowance/Allowabilty for U.S. Appl. No. 12/876,113 mailed on Jun. 22, 2015.
Office Action for U.S. Appl. No. 14/217,249 mailed on Apr. 23, 2015.
Office Action for U.S. Appl. No. 14/217,467 mailed on Apr. 27, 2015.
Office Action for U.S. Appl. No. 14/616,700 mailed on Apr. 30, 2015.
Office Action for U.S. Appl. No. 14/217,436 mailed on Sep. 11, 2015.
Office Action for U.S. Appl. No. 13/475,878, mailed on Jun. 23, 2014.
Office Action for U.S. Appl. No. 13/253,912 mailed on Jul. 16, 2014.
Office Action for U.S. Appl. No. 12/876,113 mailed on Jul. 11, 2014.
Office Action for U.S. Appl. No. 12/270,626 mailed on Feb. 3, 2012.
Office Action for U.S. Appl. No. 12/270,626 mailed on Apr. 4, 2011.
Office Action for U.S. Appl. No. 12/270,626 mailed on Mar. 15, 2013.
Notice of Allowance/Allowability for U.S. Appl. No. 12/270,626 mailed on Oct. 3, 2014.
Advisory Action for U.S. Appl. No. 12/876,113 mailed on Oct. 16, 2014.
Office Action for U.S. Appl. No. 14/297,628 mailed on Jul. 17, 2015.
Office Action for U.S. Appl. No. 13/475,878 mailed on Dec. 4, 2014.

| Field 1: Request type | Field 2: index number | Field 3: subindex number | Field 4: depends on request type |
|---|---|---|---|
| update | Index number | Subindex number | NA |
| monitor | Index number | Subindex number | Monitoring channel number |

Figure 1B

BIT-MAPPED DMA TRANSFER WITH DEPENDENCY TABLE CONFIGURED TO MONITOR STATUS SO THAT A PROCESSOR IS NOT RENDERED AS A BOTTLENECK IN A SYSTEM

CROSS-REFERENCE(S) TO RELATED APPLICATIONS

This application claims the benefit of and priority to U.S. Provisional Application 61/979,878, filed 15 Apr. 2014. This U.S. Provisional Application 61/979,878 is hereby fully incorporated herein by reference.

This application is a continuation in part of U.S. application Ser. No. 14/217,467 which claims the benefit of and priority to U.S. Provisional Application 61/802,367, filed 15 Mar. 2013. This U.S. Provisional Application 61/802,367 and U.S. application Ser. No. 14/217,467 are hereby fully incorporated herein by reference.

FIELD

Embodiments of the invention relate generally to a data storage system which is applied to a computer system that includes volatile (e.g., SRAM, SDRAM) and non-volatile (e.g., flash memory, mechanical hard disk) storage components.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

Conventionally, with data transfer systems without a dependency table, the approach is to use a buffer. Data is transferred from a memory to a buffer and then from the buffer to an IO (input/output) bus. Also, data is transferred from the IO bus to the buffer and then from the buffer to the memory. In order to ensure the transfer of valid data, a DMA (direct memory access engine) with full-time processor intervention through reception of interrupts is required. For example, every after data transfer from the IO bus to the buffer, the processor will receive an interrupt signifying that the data needed by the memory is already in the buffer, and vice versa.

1. Long Data Latency

The prior approach has no hardware-assisted concept of dependency which results to more reliance on firmware (i.e., in between transfer boundaries, the processor has to interfere to setup and enable the next transfer). These operations result in utilizing precious processor cycles.

2. High Probability of Invalid Data

Since the firmware takes the responsibility of keeping track of the data and, considering the fact that the processor is also doing other background tasks, the data being tracked is subject to high risk of being lost.

Accordingly, various conventional approaches suffer from at least the above-mentioned deficiencies and/or disadvantages.

SUMMARY

Embodiments of the invention relate generally to a data storage system which is applied to a computer system that includes volatile (e.g., SRAM, SDRAM) and non-volatile (e.g., flash memory, mechanical hard disk) storage components.

A basis of an embodiment of the invention is the Hardware-assisted DMA Transfer with Dependency. One or more of the features in commonly-owned and commonly-assigned U.S. patent application Ser. No. 14/217,467 may apply in one or more embodiments of the invention. An embodiment of the invention, which is a bit-mapped dependency table, is one application or implementation of a dependency table in a system disclosed in U.S. patent application Ser. No. 14/217,467.

An embodiment of the present invention provides a feature for a hardware-based step-by-step data transfer completion notification mechanism between the processor and DMA (Direct Memory Access) engines. An embodiment enables the execution time of the processor to focus on setting-up of DMA engines, rather than being the one to enable the dependent DMA engines to run exactly at the time when the data to be transferred is already waiting for processing in the memory, which renders the processor as the bottleneck of system.

In an embodiment of the invention, a method comprises: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table.

In another embodiment of the invention, an article of manufacture, comprises: a non-transient computer-readable medium having stored thereon instructions that permit a method comprising: issuing, by a Direct Memory Access (DMA) engine, an update request to a dependency table if the DMA engine has finished executing a first descriptor; and issuing, by the DMA engine, a monitoring request if the DMA engine is executing a second descriptor that depends on a completion of a data transfer so that the DMA engine can monitor a status of a selected subindex related to the data transfer, wherein the subindex is in the dependency table.

In yet another embodiment of the invention, an apparatus comprises: a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the subindex is in the dependency table.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

FIG. 1B is a diagram illustrating fields in an update request or monitor request issued by a DMA (Direct Memory Access) engine, in accordance with an embodiment of the invention.

DETAILED DESCRIPTION

Figure 1A:
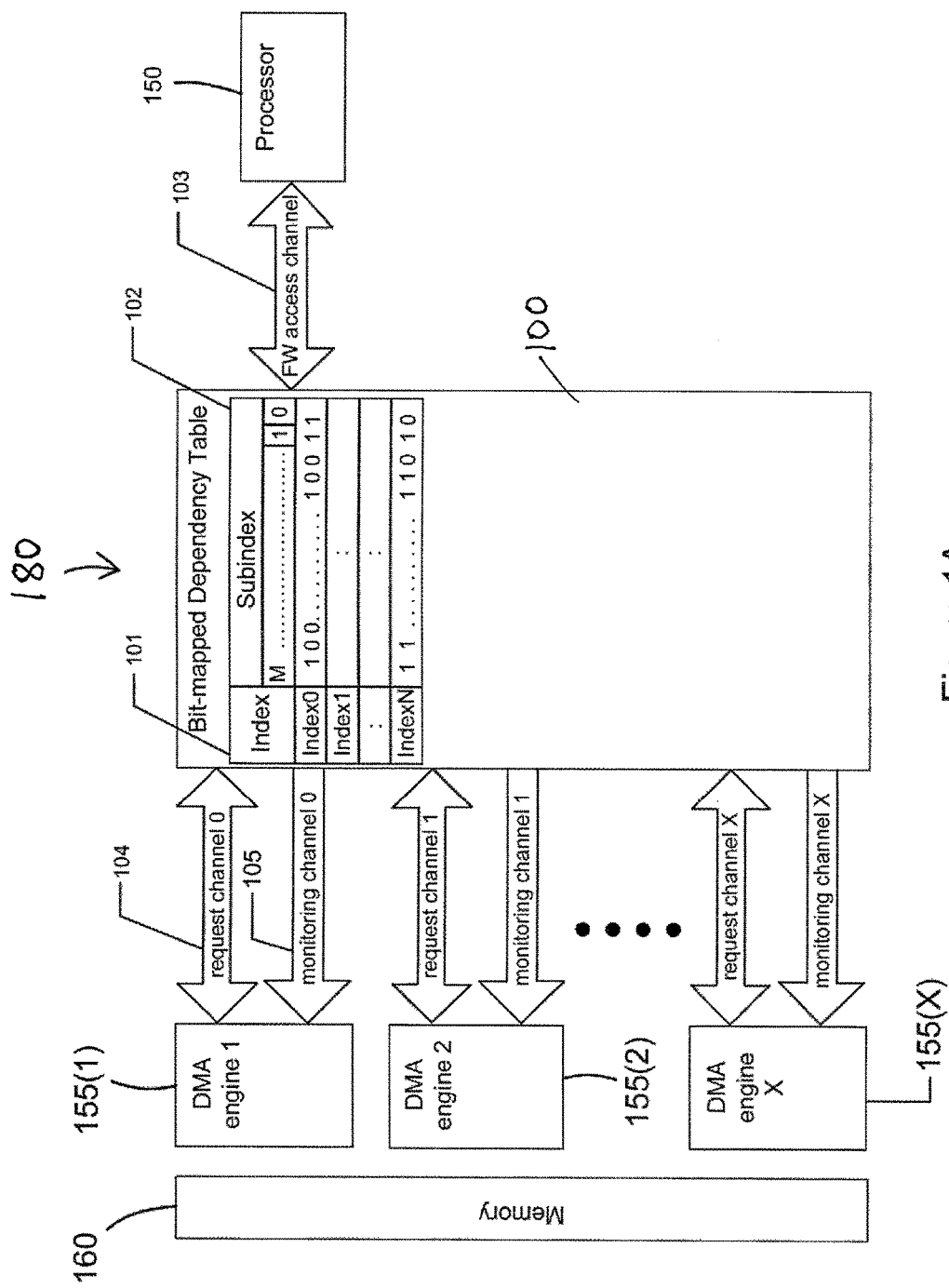
FIG. 1A is a diagram illustrating a bit-mapped dependency table, in accordance with an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection. Accordingly, if one device is coupled to another device, then that connection may be through a direct electrical connection, or through an indirect electrical connection via other devices and/or other connections.

An embodiment of the invention, which is a bit-mapped dependency table, is one application or implementation of a dependency table in a system for hardware-assisted DMA transfer with dependency disclosed in U.S. patent application Ser. No. 14/217,467.

An embodiment of the present invention provides a feature for a hardware-based step-by-step data transfer completion notification mechanism between the processor and DMA engines. An embodiment enables the execution time of the processor to focus on setting-up of DMA engines, rather than being the one to enable the dependent DMA engines to run exactly at the time when the data to be transferred is already waiting for processing in the memory, which renders the processor as the bottleneck of system.

FIG. 1A is a diagram illustrating a bit-mapped dependency table 100 in a system 180, in accordance with an embodiment of the invention. The table 100 is composed of N number of indices 101, each index includes an M number of subindices 102, and each subindex corresponds to the status of a DMA engine transfer. In FIG. 1A, the indices 101 includes Index0, Index1, through IndexN. The numbers M and N may be any suitable integer numbers. A '1' indicates that a transfer is done or completed, and a '0' indicates that a transfer is still pending.

The table 100 also has the following interfaces: FW (firmware) access channel 103, request channels 104 (ranging from 0 to X, where X is a suitable integer number) (i.e., request channels (0) to (X) 104), and monitoring channels 105 (ranging from 0 to X). The other blocks in the drawing (processor 150, DMA engines 155(1), 155(2) through 155 (X) and referred to general as DMA engine(s) 155, and memory 160) are not part of a bit-mapped dependency table in one embodiment of the invention. Upon power on reset, all subindices 101 are initialized to a status of '1', signifying that there are no pending data transfers. The processor 150 writes to or reads in the table 100 on a per index basis using the FW access channel 103, and, therefore, it is recommended that the processor 150 assigns the subindices 102 of related DMA engine transfers in a single index 101, and that the processor 150 performs these assignments in a single index write for fast execution.

The processor 150 also sets up descriptors in memory such that each descriptor corresponds to a certain DMA engine transfer, and each DMA engine transfer corresponds to a certain subindex 102 bit in the dependency table 100. Once a sufficient number of descriptors are setup, the processor 150 can enable the DMA engines 155 to execute the descriptors in memory. Dependent descriptors, which are descriptors which will only be processed by a DMA engine 155 when certain transfers are already done, request to monitor the status of the subindex in which its transfer depend on, using request channel 104. As a result of these requests, the DMA engines 155 can monitor the status of a selected index (subindex bits) using monitoring channels 105. In case of an error in a data transfer, related descriptors can be aborted and disabled by the processor 150 in memory, the concerned DMA engines 155 can also be stopped, and the processor 150 then writes all '1' in the index related to the aborted transfers in the dependency table 100. Since it was mentioned that the status subindices 102 of related data transfers is recommended to be assigned in a single index 101, the processor 150 can force the status of related transfers to '1' in a single index write, usually signifying that the related transfers are already finished, but in this case they were aborted.

An example of an actual process of using a Bit-mapped Dependency Table was discussed in the system for Hardware-assisted DMA Transfer with Dependency as disclosed in U.S. patent Ser. No. 14/217,467.

The request channels 104 and monitoring channels 105 are typically tightly coupled, as will be discussed later in this disclosure, and will be started with the discussion of the formats of the two types of requests to the dependency table 100 as shown in Table 1 and FIG. 1B.

TABLE 1

| Field 1: Request type | Field 2: index number | Field 3: subindex number | Field 4: depends on request type |
|---|---|---|---|
| Update | Index number | Subindex number | NA |
| Monitor | Index number | Subindex number | Monitoring channel number |

An update request will be issued by a DMA engine 155 if that DMA engine 155 is already finished executing a descriptor, which means that DMA engine 155 is already finished with a transfer. The update request instructs the dependency table 100 to switch a subindex bit from '0' to '1'. A target subindex 102 to be switched is addressed by field 2 and field 3 as shown in Table 1.

A monitoring request will be issued by a DMA engine 155 if the descriptor that it is executing depends on a prior transfer to finish. The monitoring request instructs the dependency table 100 to route a particular subindex bit out to a monitoring channel bit (field 4 in Table 1). The requesting DMA engine 155 monitors the monitoring channel bit, which in effect means that the requesting DMA engine 155 actually monitors the target subindex 102. The subindex 102 to be monitored represents the status of the transfer that the current transfer depends on. The target subindex 102 to be monitored is addressed by field 2 and field 3. Since a monitoring channel 105 is composed of many number of bits (which depends on design and application), field 4 selects in which the monitoring channel bit that the selected target subindex 102 will be monitored on.

Figure 2:
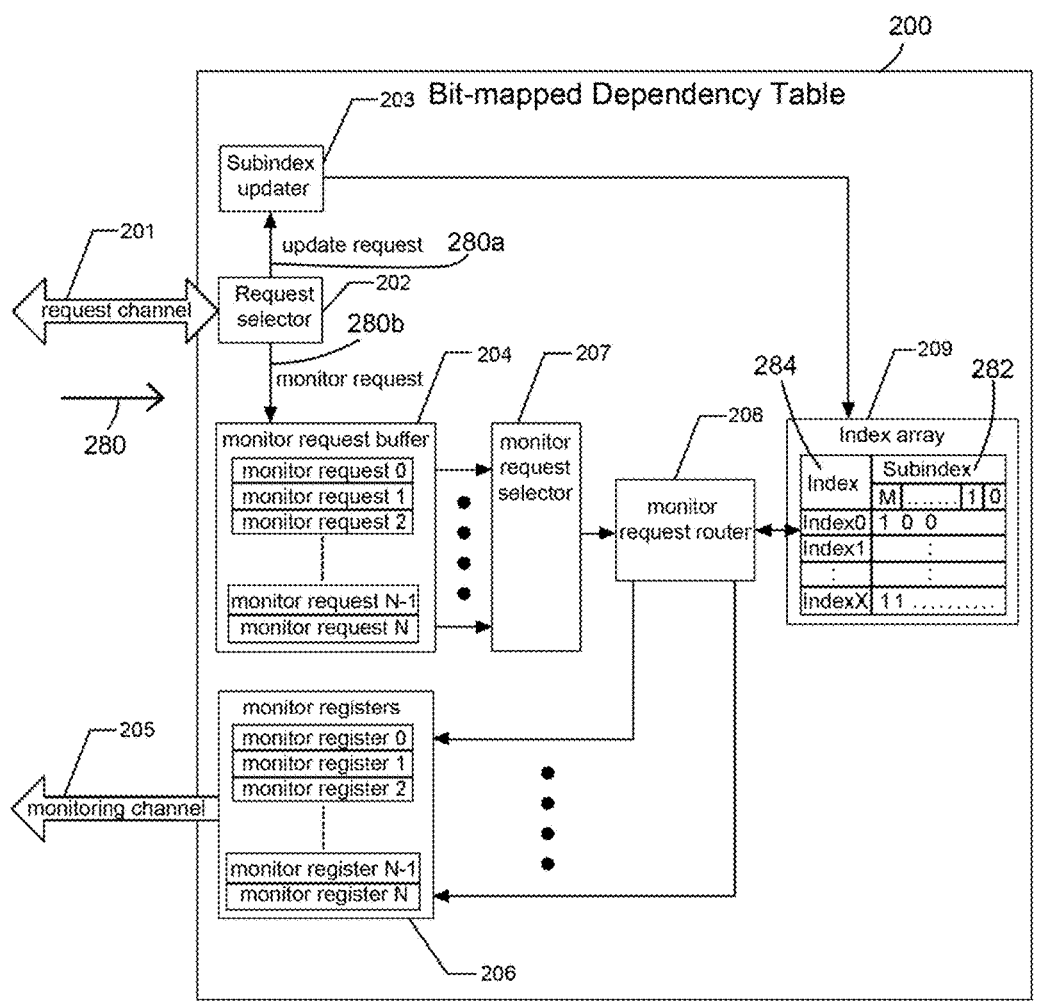
FIG. 2 is a diagram of internal blocks of a bit-mapped dependency table, wherein the internal blocks are involved with the execution of a request, in accordance with an embodiment of the invention.

FIG. 2 is a diagram of internal blocks of a bit-mapped dependency table 200, wherein the internal blocks are involved with the execution of a request, in accordance with an embodiment of the invention.

FIG. 2 shows an example request channel 201 and the relationship of the channel 201 to its corresponding monitoring channel 205. A request 280 is issued by a DMA engine 155 (FIG. 1A) using request channel 201, and a request selector 202 routes the request 280. If the request 280 is an update request 280a, the request 280 is routed to subindex updater 203, wherein the target subindex 282 (in indices 284) is immediately updated in index array 209. If the request 280 is a monitor request 280b, the request 280 is routed by the request selector 202 to monitor request buffer 204. The monitoring channel number field in the monitor request 280b determines the monitor request number in the monitor request buffer 204. The monitor request numbers are shown as monitor request 0, monitor request 1, monitor request 2 through monitor request N−1 and monitor request N. For example, a monitor request 280b for monitoring channel 205 bit 2 will be placed in monitor request 2, and upon routing to monitoring channel 205 bit 2, will be stored in monitor register 2 in the monitor registers 206. The monitor request selector 207 selects which monitor request 280b will be executed by monitor request router 208. The algorithm of monitor request selector 207 varies from, but not limited to, arbitrated (if monitor request buffer 204 is partially filled) and round-robin (if monitor request buffer 204 is full). The algorithm is typically optimized for fastest execution of the requests 280b in the monitor request buffer 204. Once a monitor request 280b is selected, monitor request router 208 routes the target subindex 282 from index array 209 to the corresponding monitor register in monitor registers 206, and subsequently out to the corresponding bit in monitoring channel 205.

Figure 3:
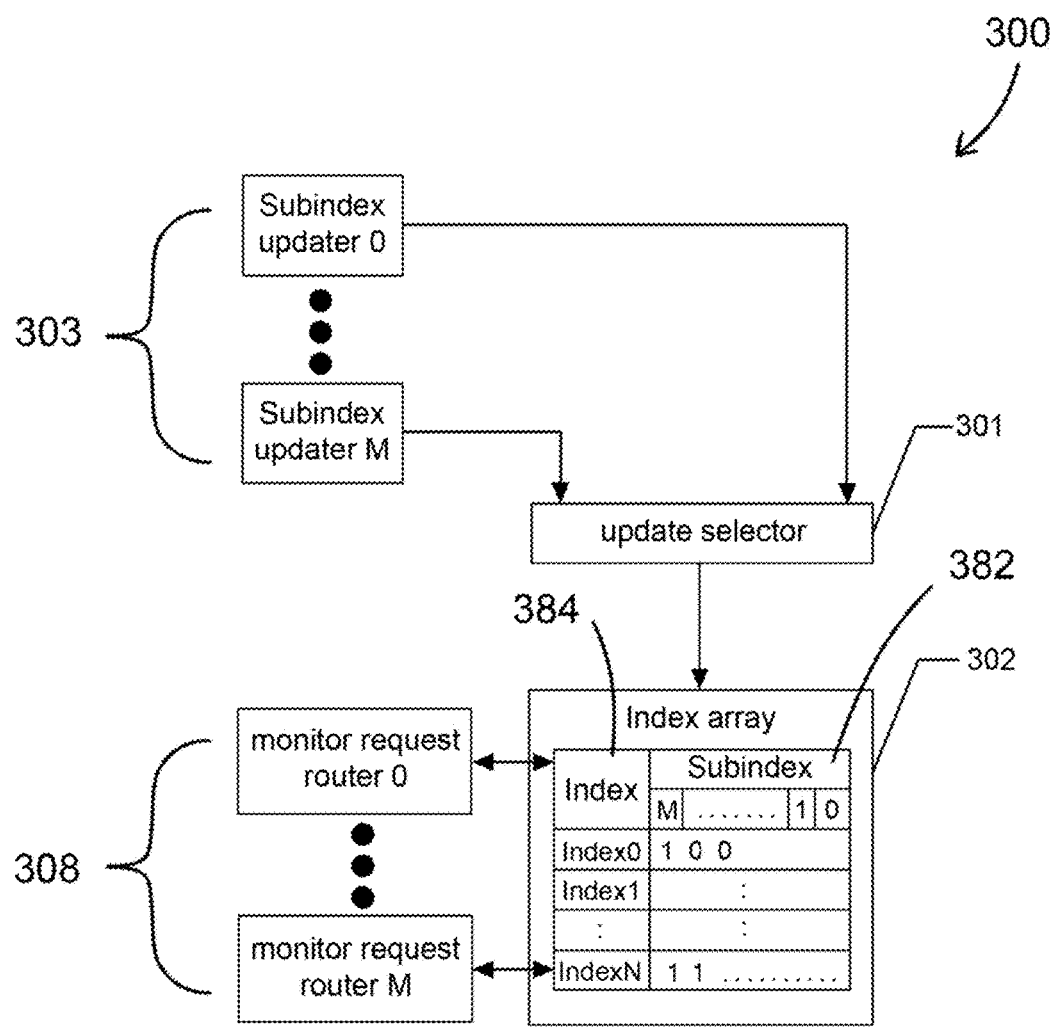
FIG. 3 is a diagram of an example bit-mapped dependency table with multiple subindex updaters and multiple monitor request routers, in accordance with an embodiment of the invention.

FIG. 3 is a diagram of an example bit-mapped dependency table 300 with multiple subindex updaters 303 and multiple monitor request routers 308, in accordance with an embodiment of the invention. The multiple subindex updaters 303 are shown by subindex updater 0 through subindex updater M), for example, and the multiple monitor request routers 308 are shown by monitor request router 0 through monitor request router M), for example. The bit-mapped dependency table 300 also includes the other internal blocks of the bit-mapped dependency table 200 if FIG. 2, but are omitted in FIG. 3 for purposes of brevity or clarity.

These multiple subindex updaters 303 and multiple monitor request routers 308 are used when there are multiple DMA engines 155 connected to the dependency table 100 like the one shown in FIG. 1, which means that there are multiple request channels 104 (FIG. 1) and multiple monitoring channels 105. For update requests, the update selector 301 selects which subindex updater 303 will be granted to write to index array 302. The update selector 301 gives fair write grant opportunities to all subindex updaters 303 such as, for example, by use of a round-robin selection process or another arbitration process. Since subindex monitoring is a read only operation, multiple monitor request routers 308 can read the subindices 382 (in indices 384) in index array 302 at the same time.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   issuing, by a Direct Memory Access (DMA) engine, an update request to a dependency table if the DMA engine has finished executing a first descriptor; and
   issuing, by the DMA engine, a monitoring request if the DMA engine is executing a second descriptor that depends on a completion of a data transfer so that the DMA engine can monitor a status of a selected subindex related to the data transfer, wherein the selected subindex is in the dependency table;
   wherein the dependency table is coupled to the DMA engine by a request channel and a monitoring channel;
   wherein the dependency table is coupled to a processor by an access channel; and
   wherein the dependency table, request channel, monitoring channel, and access channel provide a hardware-based data transfer completion notification mechanism between the processor and the DMA engine so that the processor is not rendered as a bottleneck in a system.

2. The method of claim 1, further comprising:
   updating a subindex bit value in the dependency table in response to the update request.

3. The method of claim 1, wherein each of a plurality of DMA engines uses a corresponding one of a plurality of subindex updaters that update subindex bit values in the dependency table in response to update requests from the DMA engines.

4. The method of claim 1, further comprising:
   selecting which of a plurality of subindex updates is granted to write to an index in the dependency table.

5. The method of claim 1, further comprising:
   routing the monitoring request to a monitor request buffer; and
   selecting a given monitor request in the monitor request buffer to be executed by a monitor request router.

6. The method of claim 5,
   wherein selecting the given monitor request in the monitor request buffer comprises using an arbitrated algorithm if the monitor request buffer is partially filled with monitoring requests.

7. The method of claim 5,
   wherein selecting the given monitor request in the monitor request buffer comprises using a round-robin algorithm if the monitor request buffer is full of monitoring requests.

8. The method of claim 1, wherein each of a plurality of DMA engines uses a corresponding one of a plurality of monitor request routers that execute monitor requests from the DMA engines.

9. The method of claim 1, further comprising:
   routing a target subindex in an index from the dependency table to a corresponding monitor register and subsequently out to a corresponding bit in the monitoring channel.

10. An apparatus, comprising:
    a Direct Memory Access (DMA) engine configured to issue an update request to a dependency table if the DMA engine has finished executing a first descriptor, and configured to issue a monitoring request if the DMA engine is executing a second descriptor that depends on a completion of a data transfer so that the DMA engine can monitor a status of a selected subindex related to the data transfer, wherein the selected subindex is in the dependency table;
    wherein the dependency table is coupled to the DMA engine by a request channel and a monitoring channel;
    wherein the dependency table is coupled to a processor by an access channel; and
    wherein the dependency table, request channel, monitoring channel, and access channel provide a hardware-based data transfer completion notification mechanism between the processor and the DMA engine so that the processor is not rendered as a bottleneck in a system.

11. The apparatus of claim 10, further comprising:
    an update selector configured to update a subindex bit value in the dependency table in response to the update request.

12. The apparatus of claim 10, wherein each of a plurality of DMA engines uses a corresponding one of a plurality of subindex updaters that update subindex bit values in the dependency table in response to update requests from the DMA engines.

13. The apparatus of claim 10, further comprising:
    an update selector configured to select which of a plurality of subindex updates is granted to write to an index in the dependency table.

14. The apparatus of claim 10, further comprising:
    a request selector configured to route the monitoring request to a monitor request buffer; and
    a monitor request selector configured to select a given monitor request in the monitor request buffer to be executed by a monitor request router.

15. The apparatus of claim 14,
    wherein the monitor request selector selects the given monitor request in the monitor request buffer by using an arbitrated algorithm if the monitor request buffer is partially filled with monitoring requests.

16. The apparatus of claim 14,
    wherein the monitor request selector selects the given monitor request in the monitor request buffer by using a round-robin algorithm if the monitor request buffer is full of monitoring requests.

17. The apparatus of claim 10, wherein each of a plurality of DMA engines uses a corresponding one of a plurality of monitor request routers that execute monitor requests from the DMA engines.

18. The apparatus of claim 10, further comprising:
    a monitor request router configured to route a target subindex in an index from the dependency table to a corresponding monitor register and subsequently out to a corresponding bit in the monitoring channel.

19. An article of manufacture, comprising:
    a non-transitory computer-readable medium having stored thereon instructions operable to permit an apparatus to:
    issue, by a Direct Memory Access (DMA) engine, an update request to a dependency table if the DMA engine has finished executing a first descriptor; and
    issue, by the DMA engine, a monitoring request if the DMA engine is executing a second descriptor that depends on a completion of a data transfer so that the DMA engine can monitor a status of a selected subindex related to the data transfer, wherein the selected subindex is in the dependency table;

wherein the dependency table is coupled to the DMA engine by a request channel and a monitoring channel;

wherein the dependency table is coupled to a processor by an access channel; and wherein the dependency table, request channel, monitoring channel, and access channel provide a hardware-based data transfer completion notification mechanism between the processor and the DMA engine so that the processor is not rendered as a bottleneck in a system.

20. The article of manufacture of claim 19, wherein the instructions are operable to further permit the apparatus to:

update a subindex bit value in the dependency table in response to the update request.

\* \* \* \* \*